United States Patent [19]

Schlansker et al.

[11] Patent Number: 5,850,553
[45] Date of Patent: Dec. 15, 1998

[54] REDUCING THE NUMBER OF EXECUTED BRANCH INSTRUCTIONS IN A CODE SEQUENCE

[75] Inventors: Michael S. Schlansker, Los Altos; Vinod Kathail, Cupertino, both of Calif.

[73] Assignee: Hewlett-Packard Company, Palo Alto, Calif.

[21] Appl. No.: 747,054

[22] Filed: Nov. 12, 1996

[51] Int. Cl.[6] ......................................................... G06F 9/45
[52] U.S. Cl. ......................... 395/709; 395/580; 395/581; 395/583
[58] Field of Search ................................ 395/705, 708, 395/709, 580, 581, 583

[56] References Cited

U.S. PATENT DOCUMENTS

| | | | |
|---|---|---|---|
| 4,967,351 | 10/1990 | Zmyslowski et al. | 364/200 |
| 5,193,157 | 3/1993 | Barbour et al. | 395/375 |
| 5,202,995 | 4/1993 | O'Brien | 395/700 |
| 5,596,732 | 1/1997 | Hosoi | 395/709 |
| 5,627,981 | 5/1997 | Adler et al. | 395/582 |
| 5,659,722 | 8/1997 | Blaner et al. | 395/581 |
| 5,692,169 | 11/1997 | Kathail et al. | 395/591 |
| 5,764,994 | 6/1998 | Craft | 395/709 |
| 5,778,219 | 7/1998 | Amerson et al. | 395/591 |

OTHER PUBLICATIONS

Bernstein et al., Performance Evaluation of Instruction Scheduling on the IBM RISC System/16000, Proc. 25th Ann. Intl. Symp. on Microarchitecture, Dec. 1992, IEEE Comp. Soc. Press, pp. 226–235.

*Primary Examiner*—James P. Trammell
*Assistant Examiner*—Kakali Chaki

[57] ABSTRACT

A compiler technique for reducing the number of executed branches in a code sequence. Multiple condition branch instructions in a program sequence are replaced with a single combined conditional branch instruction thereby eliminating the time-consuming execution of multiple branch instructions by a target processor.

36 Claims, 6 Drawing Sheets

REDUCING THE NUMBER OF EXECUTED BRANCH INSTRUCTIONS IN A CODE SEQUENCE

BACKGROUND OF THE INVENTION

1. Field of Invention

The present invention pertains to the field of software compilers. More particularly, this invention relates to reducing the number of executed branch instructions in a code sequence.

2. Art Background

Computer systems typically contain one or more processors that perform instruction execution. Such a processor may also be referred to as a central processing unit (CPU) or a host processor. A processor usually performs a variety of tasks in the computer system under control of a set of software programs. For example, such software programs typically include application programs, hardware driver programs, and operating system code for the computer system.

Such software programs may be written in one or more of a variety of programming languages. Such programming languages include higher order programming languages such as the C programming language as well as lower level assembly code languages which are specific to a particular processor architecture. Such programming languages are typically employed to define a program sequence of instructions for a software program in a human readable format. Such a program sequence of human readable instructions may be referred to as program source code.

Software compilers are typically employed to translate such program source code into a set of instructions suitable for consumption by a particular target processor. The instructions generated by such a software compiler may be referred to as object code or executable code or machine code. Such instructions consumed by a target processor usually include instructions for performing memory read operations, memory write operations, arithmetic operations and conditional branch operations.

In addition, prior software compilers typically schedule the instructions in object code for execution. Typically, a software compiler schedules instructions in the object code by arranging the sequence of instructions in a particular manner. For example, a prior software compiler may schedule a particular instruction for execution prior to a branch instruction by moving the particular instructions upward to an earlier point of a program sequence in relation to the branch instruction.

Typically, an instruction that may be moved upward across a condition branch instruction without violating the logical flow of the program source code is referred to as a speculative instruction. For example, such speculative instructions include some read instructions and some arithmetic instructions. Non-speculative instructions, on the other hand, are instructions that cannot be moved upward across conditional branch instructions without violating the logic of the program source code. An example of such a non-speculative instruction is a store memory instruction.

Prior software compilers commonly perform scheduling optimizations to suit the architecture of a particular target processor. Such scheduling optimizations by prior software compilers usually include the movement of speculative instructions within the object code. Such optimizations are particularly useful to enhance the instruction execution performance in target processors that are capable of executing multiple instructions concurrently. A processor capable of executing multiple instructions concurrently may be a superscalar processor, a very large instruction word processor, or a processor capable of instruction level parallelism.

However, prior software compilers usually cannot move non-speculative instructions upward across conditional branch instructions without violating the logic of the original source code. Unfortunately, such limits on the movement of non-speculative instructions usually limits the effectiveness of prior compiler optimization techniques. For example, prior software code compilers typically cannot optimize code sequences that contain a series of conditional branch instructions which are separated by non-speculative instructions.

Moreover, experience has shown that many commonly occurring program source code sequences exist that include conditional branch instructions and intervening non-speculative instructions. Experience has also shown that in many such sequences the execution of the conditional branch instructions rarely result in an actual branch being taken.

Unfortunately, a target processor that consumes code generated by prior software compilers usually executes such sequences of conditional branch and non-speculative instructions sequentially due to the lack of optimization. Such a sequential execution of conditional branch instructions is extremely time-consuming because the target processor typically computes a branch target address for each conditional branch instruction whether or not the branch is taken. Such time consuming branch operations usually slow the overall throughput of the target processor even though in many code sequences the conditional branches are rarely taken. Under such conditions, the computation time spent by the target processor to compute the branch target addresses is wasted.

SUMMARY OF THE INVENTION

A technique is disclosed for reducing the number of executed branch instructions in a code sequence. A compiler according to the present techniques replaces multiple conditional branch instructions in an original code sequence with a single combined bypass branch instruction in a compiled code sequence thereby eliminating the time-consuming execution of multiple branch instructions by a target processor.

A compiler according to the present technique generates code for determining a bypass branch condition which combines a plurality of branch conditions each for a corresponding branch instruction contained in an original code sequence. The original code sequence is replaced with an optimized code sequence that includes the code for determining the bypass branch condition and a bypass branch instruction that depends on the bypass branch condition rather than the original multiple conditional branch instructions.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
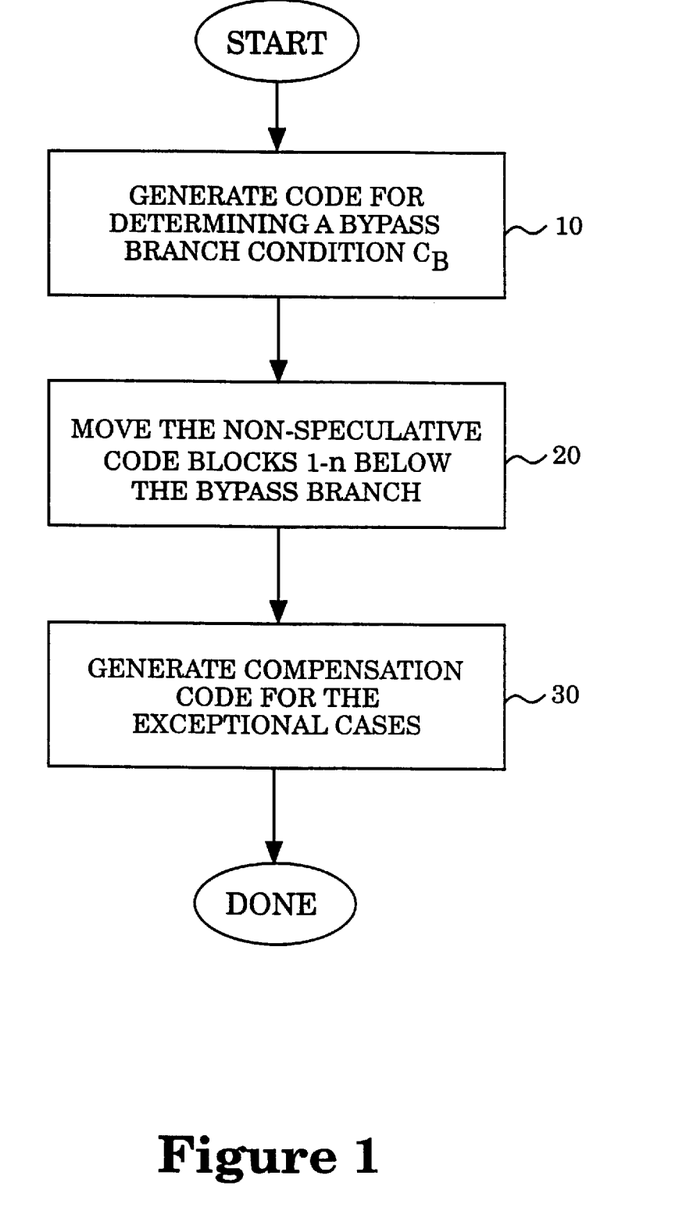
FIG. 1 illustrates a compiler method for reducing the number of branches in a program code sequence.

FIG. 1 illustrates a method for reducing the number of branches executed in a code sequence. The method shown replaces multiple branch operations of an original code sequence with a single branch operation in a compiled code sequence and thereby eliminates the time-consuming execution of multiple branch instructions by a target processor and provides an optimized code sequence for consumption by the target processor.

At step 10, code for determining a bypass branch condition $C_B$ for a bypass branch instruction is generated. This code provides a set of instructions that will replace the multiple conditional branches contained in the original code sequence. At step 20, the bypass branch instruction is generated and the non-speculative code contained in original code sequence, referred to generally as code blocks 1-n, is moved to a position for execution after the bypass branch instruction. At step 30, a set of compensation code for handling exceptional cases is generated. The compensation code handles cases wherein the bypass branch instruction in the compiled code sequence is taken.

Figure 2:
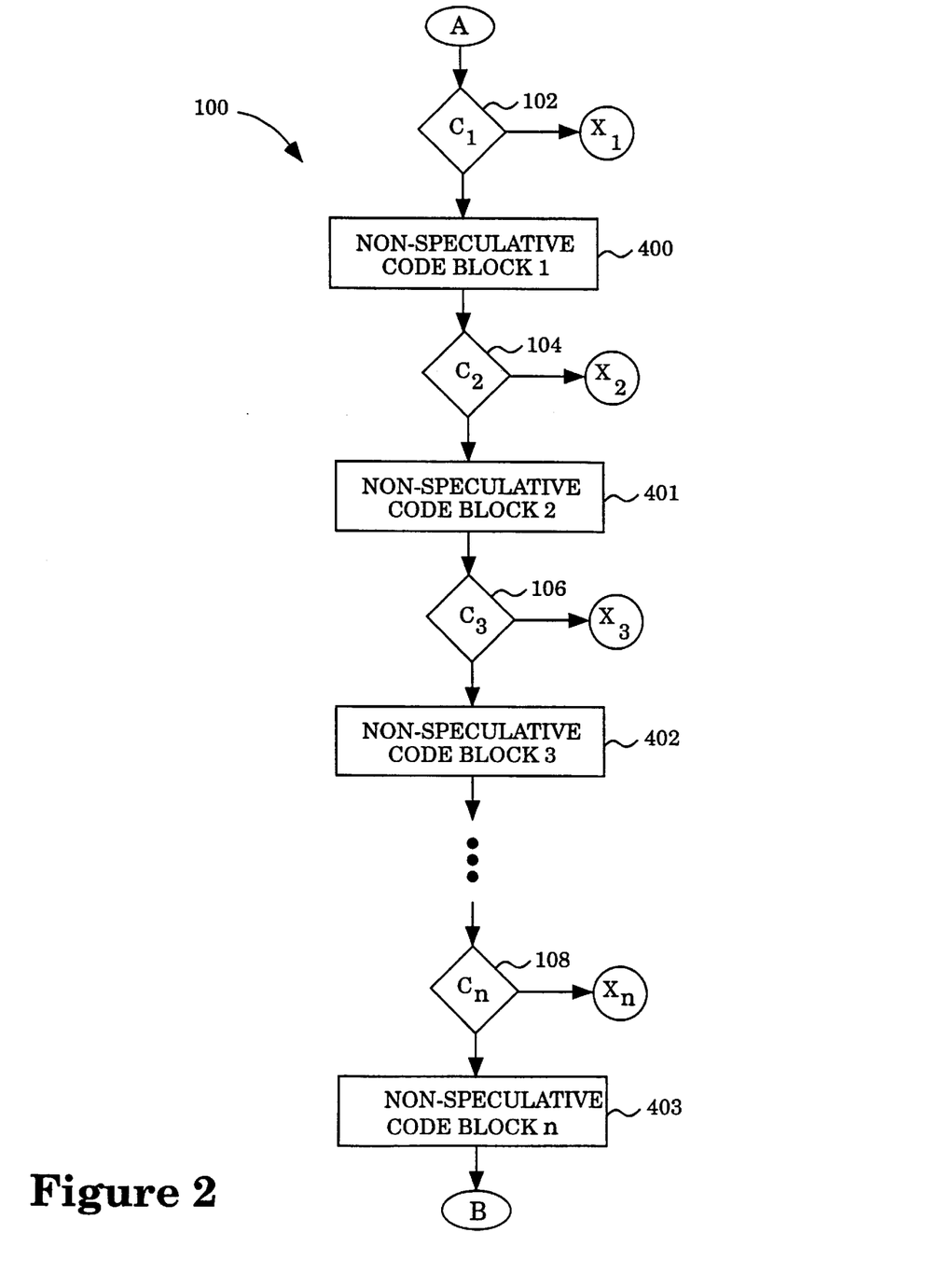
FIG. 2 schematically illustrates a program code sequence prior to optimization wherein the program code sequence includes a set of code blocks 1-n which are guarded by a set of intervening conditional branch operations.

FIG. 2 illustrates schematically a code sequence 100 prior to optimization. The code sequence 100 includes a set of non-speculative code blocks 400–403 (code blocks 1-n) which are separated by a set of intervening conditional branch operations 102–108. The conditional branch operations 102–108 depend on the corresponding branch conditions $C_1$ through $C_n$. The code sequence 100 includes an entry path A and a fall thru exit path B. The conditional branch operations 102–108 provide intermediate exit paths $X_1$ through $X_n$.

The conditional branch operations 102–108 are said to guard the corresponding non-speculative code blocks 1-n. For example, the conditional branch operation 102 is said to guard the non-speculative code block 1 because the non-speculative code block 1 cannot execute until the conditional branch operation 102 resolves the branch condition $C_1$ during execution of the code sequence 100. The conditional branch operation 102 either takes the branch to $X_1$ or falls thru to the non-speculative code block 1.

In one embodiment, the code sequence 100 is referred to as a superblock. A superblock is defined as a sequence of code having a single entry, a fall-thru exit, and one or more intermediate branch instructions that provide exit paths out of the superblock. A superblock provides a suitable region of code for optimization by the software code compiler. In other embodiments, other types of code regions may be chosen as a basis for compiler optimization operations.

The non-speculative code blocks 1-n each contain one or more non-speculative instructions which cannot be relocated across the conditional branch operations 102–108. An example of such a non-speculative instruction is a store memory instruction. Any speculative instructions that may have been present in the code sequence 100 prior to step 10 may have been moved up ahead of entry path A in a manner consistent with known compiler optimization techniques.

Program sequences such as the code sequence 100 occur commonly in wide variety of programs wherein the most commonly executed path flows from entry path A down through the fall-thru exit path B with none of the conditional branches $C_1$ through $C_n$ causing an actual branch. This most commonly taken path is referred to as the on-trace path through the code sequence 100. The present software code compiler optimizes for the execution of an on-trace code path in an optimized code sequence including the non-speculative code blocks 1-n but without the intervening conditional branch operations 102–108.

A compiler according to the present techniques generates a set of code for determining a bypass branch condition $C_B$ at step 10 and generates a bypass branch operation that depends on $C_B$. The code for determining the bypass branch condition $C_B$ performs a logical function on the branch conditions $C_1$ through $C_n$. This logical function is determined such that the bypass branch operation that depends on $C_B$ will be taken if any one or more of the branch conditions $C_1$ through $C_n$ would have caused a branch during execution of the conditional branch operations 102–108.

At step 20, the compiler according to the present techniques moves the non-speculative code blocks 1-n to a position below the bypass branch operation that depends on $C_B$. At step 30, the compiler according to the present techniques generates the compensation code that ensures that the original logic of the code sequence 100 is met when any one or more of the branch conditions $C_1$ through $C_n$ would have caused a branch during execution of the conditional branch operations 102–108.

Figure 3:
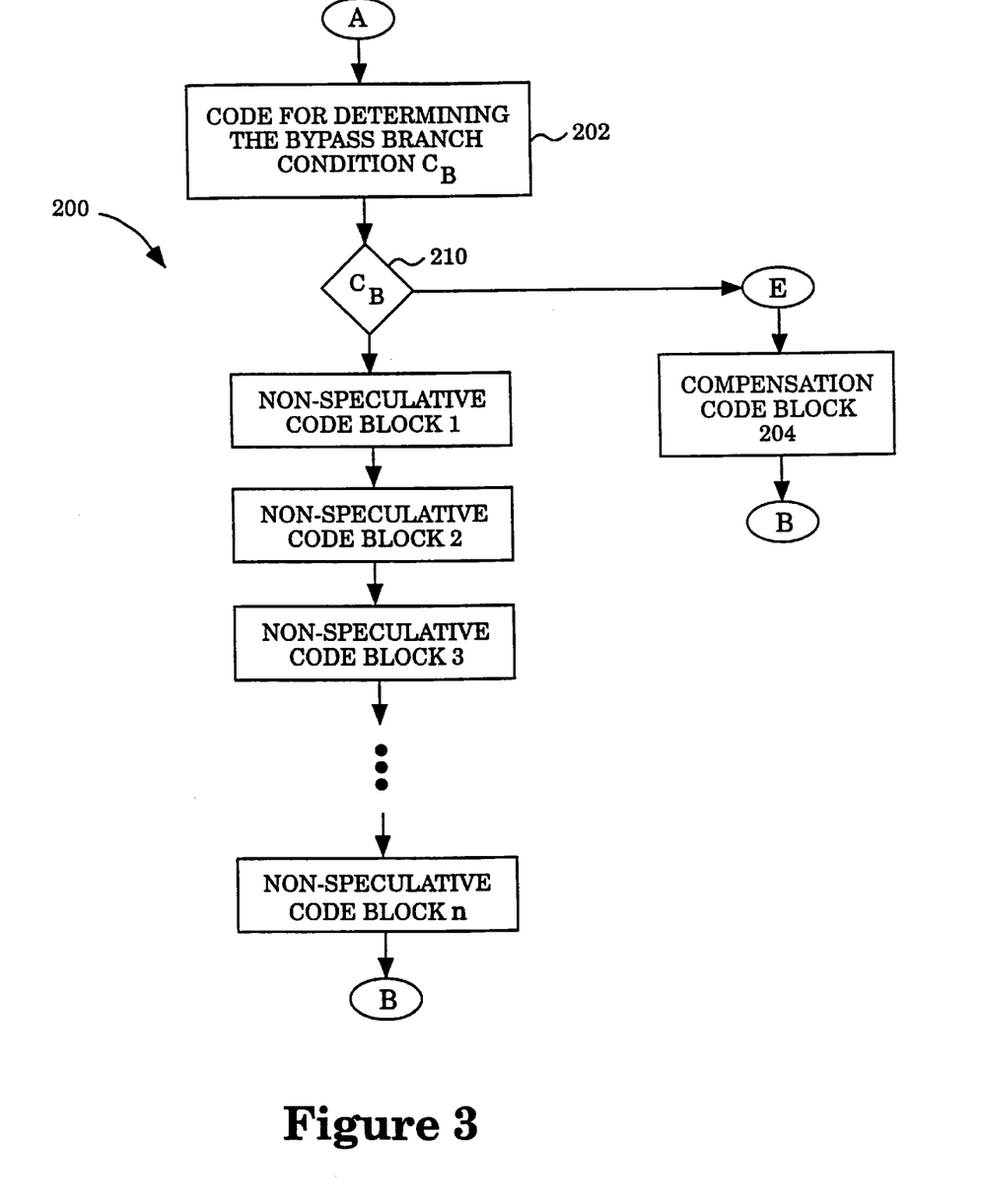
FIG. 3 illustrates an optimized code sequence having fewer branch instructions than the original program code sequence.

FIG. 3 illustrates an optimized code sequence 200 generated by the present software code compiler. The optimized code sequence 200 provides an on-trace path which includes a code block 202 followed by a bypass branch operation 210 that depends on $C_B$ followed by the non-speculative code blocks 1-n. The code block 202 contains the code for determining the bypass branch condition $C_B$ which was generated at step 10. The non-speculative code blocks 1-n in the optimized code sequence 200 are replicated from the original code sequence 100. A code block 204 provides an off-trace path which contains a set of compensation code for the rare case wherein one or more of the branch conditions $C_1$ through $C_n$ require a branch to a differing program path.

An examination of the optimized code sequence 200 reveals that the conditional branch operations 102–108 that originally guarded the non-speculative code blocks 1-n in the original code sequence 100 have been eliminated. The elimination of the conditional branch operations 102–108 avoids the delays that would otherwise have been caused by their time consuming execution. The guarding function of the conditional branch operations 102–108 in the code sequence 100 is replaced by the bypass branch operation 210 in the optimized code sequence 200.

The code block 202 determines the bypass branch condition $C_B$ by performing a logical function on the branch conditions $C_1$ through $C_n$. The code block 202 generates the bypass branch condition $C_B$ such that the bypass branch operation 210 will transfer program control to the compensation code block 204 if any one or more of the branch conditions $C_1$ through $C_n$ would have caused a branch through the corresponding exit paths $X_1$ through $X_n$ during execution of the conditional branch operations 102–108 in the original code sequence 100.

Figure 4A:
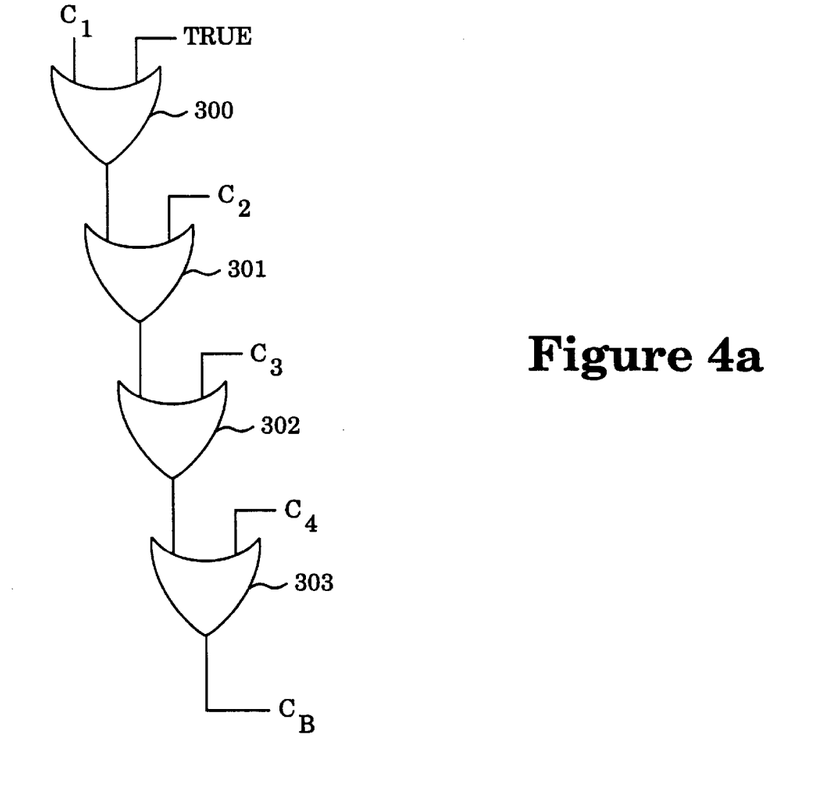
FIGS. 4a–4b illustrate examples of logic functions for determining the bypass branch condition.
Figure 4B:
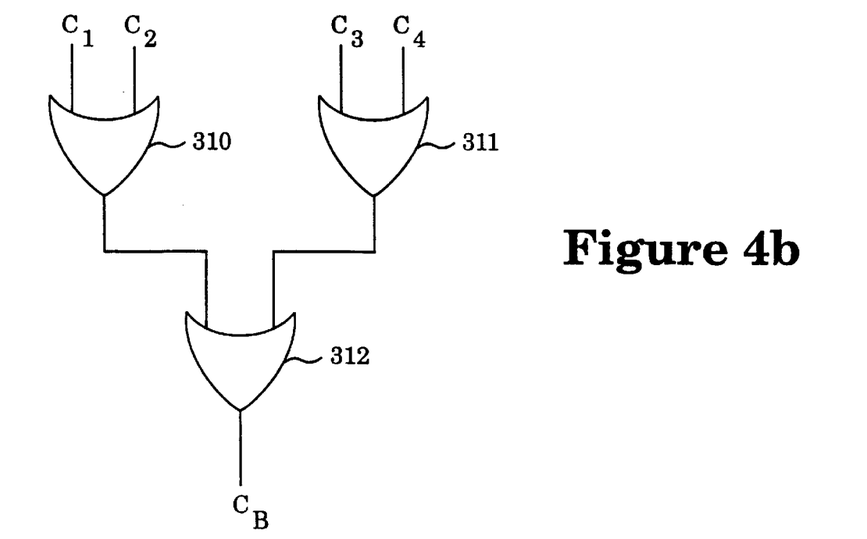

FIGS. 4a–4b illustrate examples of a logic function for determining the bypass branch condition $C_B$ for a case wherein n=4. In one example, a series of logical OR operations 300–303 are performed to combine the branch conditions $C_1$ through $C_4$. The logical OR operations 300–303 may be realized by a series of OR instructions in the code block 202. The OR operations 300–303 may alternatively realized by logical AND instructions by appropriately inverting the true/false state of the branch conditions $C_1$ through $C_4$ according to DeMorgan's law.

In the other example, results of a logical OR operation 310 on the branch conditions $C_1$ and $C_2$ and a logical OR operation 311 on the branch conditions $C_3$ and $C_4$ are combined in a logical OR operation 312. As with the previous example, the OR operation my be realized by OR instructions or by AND instructions in the code block 202. This example has the advantage that the logical operations 310 and 311 my be performed in parallel in a target processor capable of executing multiple logic instructions concurrently.

The code block 204 contains the compensation code that ensures that the original logic of the code sequence 100 is met when any one or more of the branch conditions $C_1$ through $C_n$ would have caused a branch during execution of the conditional branch operations 102–108. Accordingly, the code block 204 replicates the logic originally provided by the conditional branch operations 102–108 in the code sequence 100.

Figure 5:
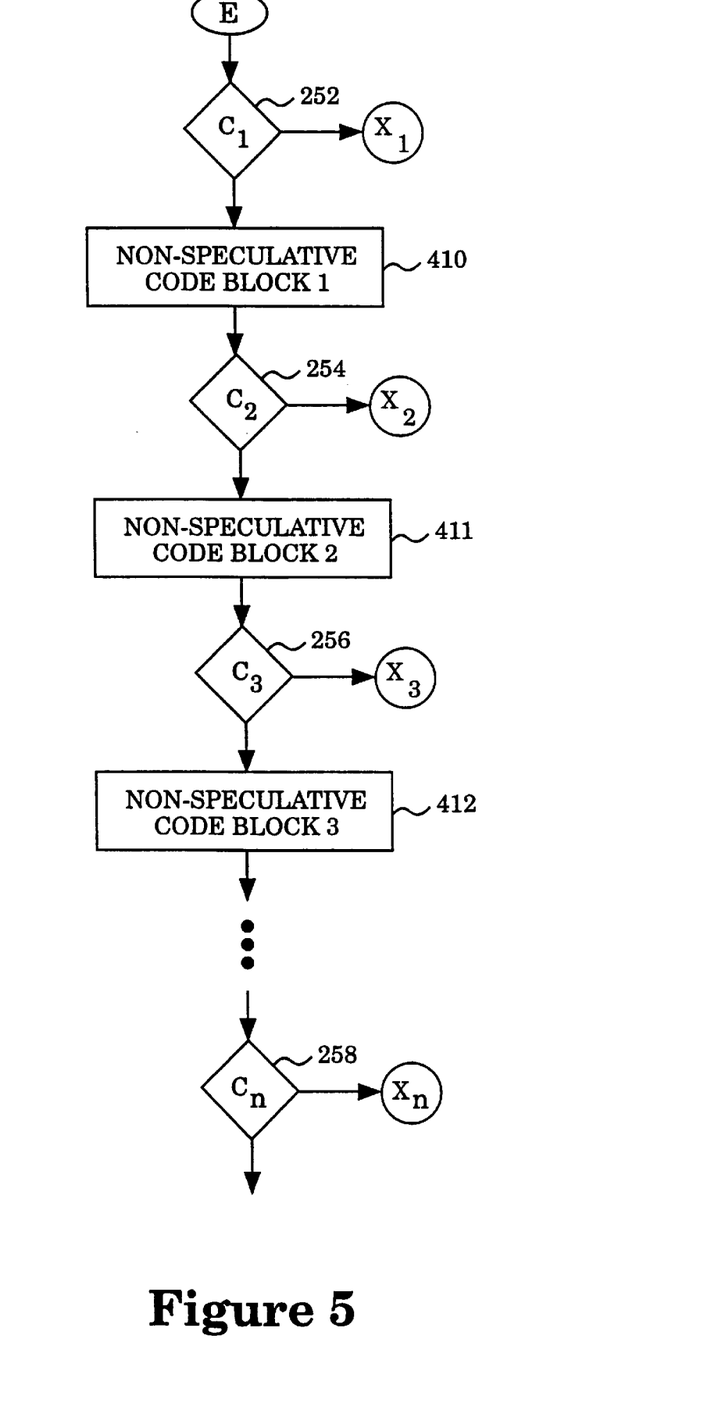
FIG. 5 illustrates the compensation code contained in an off-trace path of the optimized code sequence.

FIG. 5 illustrates the compensation code contained in the code block 204. The compensation code includes a set of code blocks 410–412 which replicate the non-speculative code blocks 1–3 which are guarded by a set of intervening conditional branch operations 252–258. The conditional branch operations 252–258 depend on the corresponding branch conditions $C_1$ through $C_n$ as in the original code sequence 100. The compensation code provides intermediate exit paths $X_1$ through $X_n$ as found in the logic of the code sequence 100.

An example program code sequence suitable for optimization with the present methods is shown below in a pseudo-code.

```
e1 = cmp(x==error1)   *test reg x for error1
br err1 if e1         *branch if error1
str data1,mem         *otherwise store data1 to mem
e2 = cmp(x==error2)   *test reg x for error2
br err2 if e2         *branch if error2
str data2,mem         *otherwise store data2 to mem
e3 = cmp(x==error3)   *test reg x for error3
br err3 if e1         *branch if error3
str data3,mem         *otherwise store data3 to mem
e4 = cmp(x==error4)   *test reg x for error4
br err4 if e4         *branch if error4
str data4,mem         *otherwise store data4 to mem
```

The error conditions e1 through e4 correspond to the branch conditions $C_1$ through $C_n$ in the program sequence 100. The non-speculative code blocks 1-n are represented by the store memory instructions str data1,mem through str data4,mem, respectively. The branch target addresses err1 through err3 correspond to the exit paths $X_1$ through $X_n$ in code sequence 100.

The example program code sequence shown above commonly occurs in a variety of software programs wherein write operations to memory are guarded by intervening conditional error testing. During such operations the conditional branches to error routines err1-err4 are rarely taken. Thus, it is desirable for the software compiler to optimize for execution vertically through the program sequence.

An example optimized program code sequence according to the present methods is shown below in the pseudo-code.

```
t1 = x==error1              *test for error1
t2 = x==error2              *test for error2
t3 = x==error3              *test for error3
t4 = x==error4              *test for error4
a=OR(t1,t2)                 *determine the bypass
b=OR(t3,t4)                 *branch condition (error)
error=OR(a,b)               *
br compensation_code if error *bypass branch on error
str data1,mem               *otherwise, execute
str data2,mem               *the non-speculative
str data3,mem               *code blocks 1–4
str data4,mem               *
continue
compensation_code:          *here if bypass branch takes
e1 = cmp(x==error1)         *test reg x for error1
br err1 if e1               *branch if error1
str data1,mem               *otherwise store data1 to mem
e2 = cmp(x==error2)         *test reg x for error2
br err2 if e2               *branch if error2
str data2,mem               *otherwise store data2 to mem
e3 = cmp(x==error3)         *test reg x for error3
br err3 if e1               *branch if error3
str data3,mem               *otherwise store data3 to mem
e4 = cmp(x==error4)         *test reg x for error4
br err4 if e4               *branch if error4
```

The example code for determining the bypass branch condition shown above conforms to the logic shown in FIG. 4b wherein the term "error" represents the bypass branch condition $C_B$. In the on-trace path of the optimized code sequence, a single bypass branch instruction (br compensation_code if error) replaces the four conditional branches that appeared in the original program sequence and thereby eliminates the time-consuming execution of three addition branch instructions in the on-trace code path.

The techniques for reducing the number of on-trace branch instructions disclosed herein should not be employed if any of the non-speculative code blocks 1 through n-1 contain instructions that affect the branch conditions $C_2$ through $C_n$. An example of such a code block having instructions that affect a subsequent branch condition is shown below in pseudocode.

```
str data1,mem         *store data1 to mem
1d x,mem              *a load from memory which depends
                      *on the previous store to memory
e2 = cmp(x==error2)   *test reg x for error2
br err2 if e2         *branch if error2
```

In this example, the use of the optimizations disclosed herein are precluded because the non-speculative instruction str data1,mem affects the ld x,mem instruction which in turn affect subsequent branch condition e2.

Figure 6:
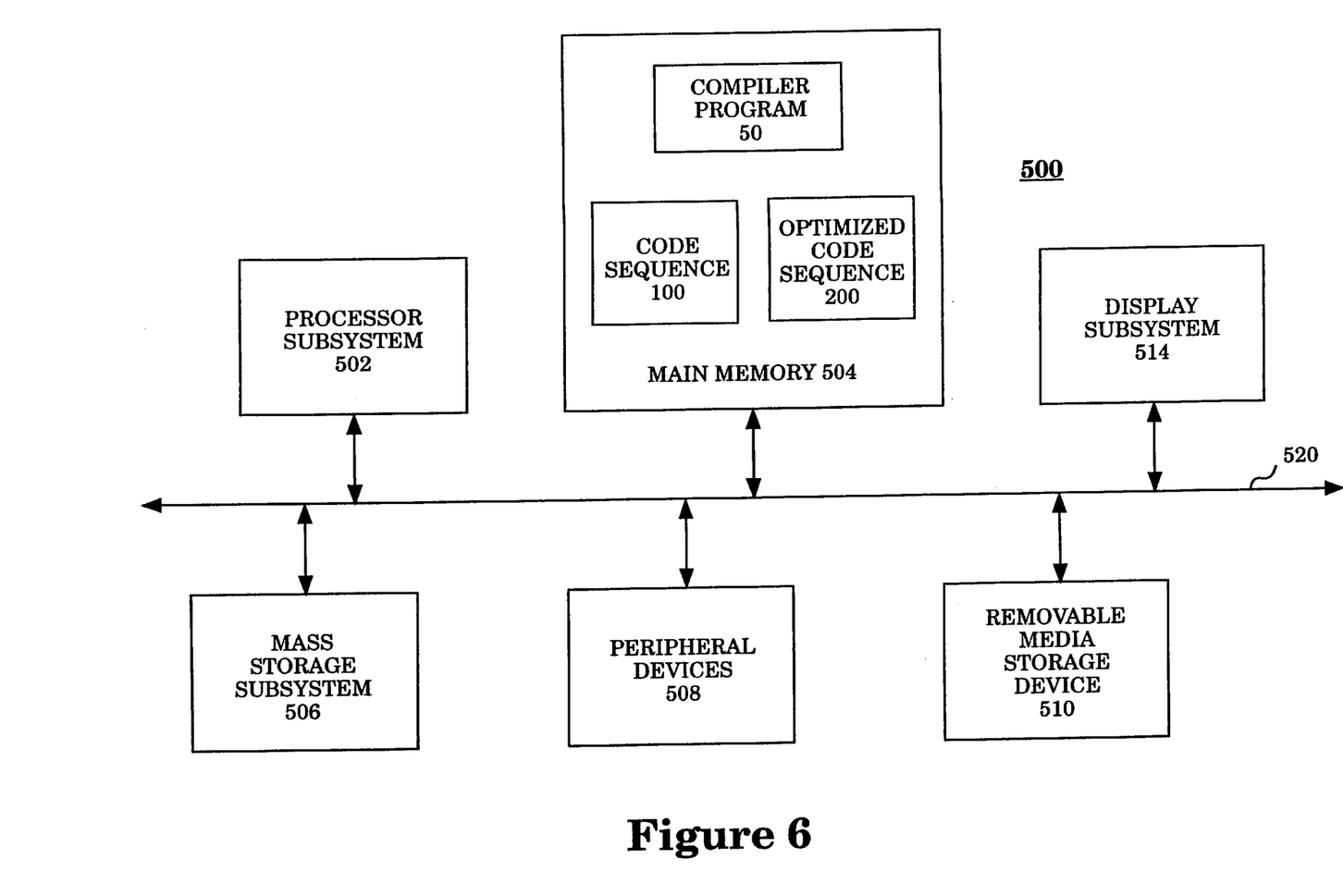
FIG. 6 illustrates a computer system that includes a compiler which reduces the number of executed branch instructions in a code sequence.

FIG. 6 illustrates a computer system 500 that executes a compiler program 50 which reduces the number of executed branch instructions in a code sequence as disclosed herein. The computer system 500 includes a processor subsystem 502, a main memory 504 and an interconnect bus 520. The processor subsystem 502 may include a single microprocessor or central processing unit (CPU) or may include a plurality of microprocessors or CPUs.

The main memory 504 accommodates the storage of instructions and data for execution by the processor subsystem 502. The main memory 504 accommodates the compiler program 50 along with a code sequence 100 (the original code sequence) and the optimized code sequence 200 (the compiled code sequence). The main memory 504 may include dynamic random access memory (DRAM) as well as a cache memory.

The computer system 500 also includes a mass storage subsystem 506, a set of peripheral devices 508, a removable-media storage device 510, and an input control and display subsystem 514. In one embodiment the various components of the computer system 500 communicate via the interconnect bus 520 which is a local bus. In other embodiments elements of the computer system 500 may be connected via one or more data transport mechanisms. Such transport mechanisms may include, for example, processor buses as well as specialized input/output peripheral buses.

The mass storage subsystem 506, which may be implemented with a magnetic disk drive or an optical disk drive, is a non-volatile storage device for storing data and instructions for use by the processor subsystem 502. In one embodiment, the mass storage subsystem 506 stores the compiler program 50 and related system software for loading to the main memory 504. The mass storage subsystem 506 also stores source code containing the code sequence 100 for loading to the main memory 504 and accommodates storage of object code including the optimized code sequence 200.

The removable-media storage device 510 operates in conjunction with a portable non-volatile storage medium, such as a magnetic tape, a floppy disk or a compact disc read only memory (CD-ROM), to input and output data and code to and from the computer system 500. In one embodiment, the compiler program 50 and related system software are stored and distributed on such a portable medium, and are input to the computer system 500 via the removable-media storage device 510.

The peripheral devices 508 may include any type of computer input device, such as an input/output (I/O) interface, to add additional functionality to the computer system 500. For example, the peripheral devices 508 may include a network interface card for interfacing the computer system 500 to a network. The compiler program 50 disclosed herein may be input to the computer system 500 via a portable storage medium or a network.

The compiler program 50 implements the techniques disclosed herein for reducing the number of executed branch instructions. The compiler program 50 provides a plurality of computer executable instructions for implementation on a general purpose computer system such as the computer system 500. Prior to loading into the computer system 500, the compiler program 50 may reside as encoded information on a computer readable medium, such as a magnetic floppy disk, magnetic tape, and compact disc read only memory (CD-ROM).

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A computer-implemented method for reducing a number of executed branch instructions in an original code sequence, comprising the steps of:

generating a set of instructions for determining a bypass branch condition by combining a plurality of branch conditions each for a corresponding branch instruction contained in the original code sequence;

replacing the original code sequence with a compiled code sequence that includes the instructions for determining the bypass branch condition and that further includes a bypass branch instruction that depends on the bypass branch condition.

2. The method of claim 1, wherein at least one of the branch instructions in the original code sequence occurs before a code block contained in the original code sequence.

3. The method of claim 2, wherein the step of replacing the code sequence with the compiled code sequence includes the step of replicating the code block from the original code sequence to the compiled code sequence such that the bypass branch instruction occurs before the code block in the compiled code sequence.

4. The method of claim 3, wherein the code block includes at least one non-speculative instruction.

5. The method of claim 4, wherein the non-speculative instruction is a store memory instruction.

6. The method of claim 1, wherein the code for determining the bypass branch condition performs a logic function on the branch conditions such that the bypass branch instruction causes a branch in the compiled code sequence if one or more of the branch conditions would have caused a branch in the original code sequence.

7. The method of claim 6, further comprising the steps of:

generating a compensation code block that replicates the branch instructions and the code block from the original code sequence;

placing the compensation code block in the compiled code sequence such that the branch in the compiled code sequence is targeted for the compensation code block.

8. The method of claim 1, wherein the code for determining the bypass branch condition performs a logic function on the branch conditions such that the bypass branch instruction does not cause a branch in the compiled code sequence if one or more of the branch conditions would have caused a branch in the original code sequence.

9. The method of claim 8, further comprising the steps of:

generating a compensation code block that replicates the branch instructions and the code block from the original code sequence;

placing the compensation code block in the compiled code sequence such that the branch in the compiled code sequence falls thru to the compensation code block.

10. A computer-readable media including compiler program that reduces a number of executed branch instructions in an original code sequence, the computer program comprising:

compiler code for generating a set of instructions for determining a bypass branch condition by combining a plurality of branch conditions each for a corresponding branch instruction contained in the original code sequence;

compiler code for replacing the original code sequence with a compiled code sequence that includes the instructions for determining the bypass branch condition and that further includes a bypass branch instruction that depends on the bypass branch condition.

11. The compiler program of claim 10, wherein at least one of the branch instructions in the original code sequence occurs before a code block contained in the original code sequence.

12. The compiler program of claim 11, wherein the compiler code for replacing the original code sequence with the compiled code sequence includes compiler code for replicating the code block from the original code sequence to the compiled code sequence such that the bypass branch instruction occurs before the code block in the compiled code sequence.

13. The compiler program of claim 12, wherein the code block includes at least one non-speculative instruction.

14. The compiler program of claim 13, wherein the non-speculative instruction is a store memory instruction.

15. The compiler program of claim 10, wherein the compiler code for determining the bypass branch condition performs a logic function on the branch conditions such that the bypass branch instruction causes a branch in the compiled code sequence if one or more of the branch conditions would have caused a branch in the original code sequence.

16. The compiler program of claim 15, further comprising:
   compiler code for generating a compensation code block that replicates the branch instructions and the code block from the original code sequence;
   compiler code for placing the compensation code block in the compiled code sequence such that the branch in the compiled code sequence is targeted for the compensation code block.

17. The compiler program of claim 10, wherein the compiler code for determining the bypass branch condition performs a logic function on the branch conditions such that the bypass branch instruction does not cause a branch in the compiled code sequence if one or more of the branch conditions would have caused a branch in the original code sequence.

18. The compiler program of claim 17, further comprising:
   compiler code for generating a compensation code block that replicates the branch instructions and the code block from the original code sequence;
   compiler code for placing the compensation code block in the compiled code sequence such that the branch in the compiled code sequence falls thru to the compensation code block.

19. A computer apparatus for reducing a number of executed branch instructions in an original code sequence, comprising:
   means for generating a set of instructions for determining a bypass branch condition by combining a plurality of branch conditions each for a corresponding branch instruction contained in the original code sequence;
   means for replacing the original code sequence with an optimized code sequence that includes the instructions for determining the bypass branch condition and that further includes a bypass branch instruction that depends on the bypass branch condition.

20. The apparatus of claim 19, wherein at least one of the branch instructions in the original code sequence occurs before a code block contained in the original code sequence.

21. The apparatus of claim 20, wherein the means for replacing the code sequence with the compiled code sequence includes means for replicating the code block from the original code sequence to the compiled code sequence such that the bypass branch instruction occurs before the code block in the compiled code sequence.

22. The apparatus of claim 21, wherein the code block includes at least one non-speculative instruction.

23. The apparatus of claim 22, wherein the non-speculative instruction is a store memory instruction.

24. The apparatus of claim 19, wherein the code for determining the bypass branch condition performs a logic function on the branch conditions such that the bypass branch instruction causes a branch in the compiled code sequence if one or more of the branch conditions would have caused a branch in the original code sequence.

25. The apparatus of claim 24, further comprising:
   means for generating a compensation code block that replicates the branch instructions and the code block from the original code sequence;
   means for placing the compensation code block in the compiled code sequence such that the branch in the compiled code sequence is targeted for the compensation code block.

26. The apparatus of claim 19, wherein the code for determining the bypass branch condition performs a logic function on the branch conditions such that the bypass branch instruction does not cause a branch in the compiled code sequence if one or more of the branch conditions would have caused a branch in the original code sequence.

27. The apparatus of claim 26, further comprising:
   means for generating a compensation code block that replicates the branch instructions and the code block from the original code sequence;
   means for placing the compensation code block in the compiled code sequence such that the branch in the compiled code sequence falls thru to the compensation code block.

28. A computer-readable storage media that contains a compiler program that when executed by a computer reduces a number of executed branch instructions in an original code sequence by performing the steps of:
   generating a set of instructions for determining a bypass branch condition by combining a plurality of branch conditions each for a corresponding branch instruction contained in the original code sequence;
   replacing the original code sequence with a compiled code sequence that includes the instructions for determining the bypass branch condition and that further includes a bypass branch instruction that depends on the bypass branch condition.

29. The computer-readable storage media of claim 28, wherein at least one of the branch instructions in the original code sequence occurs before a code block contained in the original code sequence.

30. The computer-readable storage media of claim 29, wherein the step of replacing the original code sequence with the compiled code sequence includes the step of replicating the code block from the original code sequence to the compiled code sequence such that the bypass branch instruction occurs before the code block in the compiled code sequence.

31. The computer-readable storage media of claim 30, wherein the code block includes at least one non-speculative instruction.

32. The computer-readable storage media of claim 31, wherein the non-speculative instruction is a store memory instruction.

33. The computer-readable storage media of claim 28, wherein the computer when executing the code for determining the bypass branch condition performs a logic function on the branch conditions such that the bypass branch instruction causes a branch in the compiled code sequence if one or more of the branch conditions would have caused a branch in the original code sequence.

34. The computer-readable storage media of claim 33, wherein the computer when executing the compiler program further performs the steps of:

generating a compensation code block that replicates the branch instructions and the code block from the original code sequence;

placing the compensation code block in the compiled code sequence such that the branch in the compiled code sequence is targeted for the compensation code block.

35. The computer-readable storage media of claim 28, wherein the computer when executing the code for determining the bypass branch condition performs a logic function on the branch conditions such that the bypass branch instruction does not cause a branch in the compiled code sequence if one or more of the branch conditions would have caused a branch in the original code sequence.

36. The computer-readable storage media of claim 35, wherein the computer when executing the compiler program further performs the steps of:

generating a compensation code block that replicates the branch instructions and the code block from the original code sequence;

placing the compensation code block in the compiled code sequence such that the branch in the compiled code sequence falls thru to the compensation code block.

* * * * *